(12) United States Patent
Tenni et al.

(10) Patent No.: US 8,677,243 B2
(45) Date of Patent: Mar. 18, 2014

(54) MEDIA RECOMMENDATION SYSTEM AND METHOD

(75) Inventors: Jarno Tenni, Helsinki (FI); Zhangjing Ming, Espoo (FI); Osmo Salo, Klaukkala (FI); David Roberton, Oxfordshire (GB); Jack Horner, London (GB); Geoff Gray, London (GB); Miakki Frisk, Espoo (FI)

(73) Assignee: Nokia Corporation, Espoo (FI)

( * ) Notice: Subject to any disclaimer, the term of this patent is extended or adjusted under 35 U.S.C. 154(b) by 1604 days.

(21) Appl. No.: 11/469,566

(22) Filed: Sep. 1, 2006

(65) Prior Publication Data

US 2008/0059422 A1 Mar. 6, 2008

(51) Int. Cl.
*G06F 3/16* (2006.01)

(52) U.S. Cl.
USPC ............ 715/727; 84/615; 84/612; 369/30.09; 369/30.03; 725/45; 725/46; 705/7.29; 707/5; 707/104.1; 709/201; 709/217; 709/219

(58) Field of Classification Search
USPC ......................................................... 715/727
See application file for complete search history.

(56) References Cited

U.S. PATENT DOCUMENTS

| | | | | |
|---|---|---|---|---|
| 8,069,076 | B2* | 11/2011 | Oddo | 705/7.29 |
| 2004/0073921 | A1* | 4/2004 | Neely et al. | 725/45 |
| 2004/0190389 | A1* | 9/2004 | Nakano et al. | 369/30.03 |
| 2004/0221308 | A1* | 11/2004 | Cuttner et al. | 725/46 |
| 2005/0038819 | A1* | 2/2005 | Hicken et al. | 707/104.1 |
| 2006/0015580 | A1* | 1/2006 | Gabriel et al. | 709/219 |
| 2006/0083119 | A1* | 4/2006 | Hayes | 369/30.09 |
| 2006/0169126 | A1* | 8/2006 | Ishiwata et al. | 84/615 |
| 2006/0195790 | A1* | 8/2006 | Beaupre et al. | 715/727 |
| 2006/0206582 | A1* | 9/2006 | Finn | 709/217 |
| 2006/0218225 | A1* | 9/2006 | Hee Voon et al. | 709/201 |
| 2006/0253782 | A1* | 11/2006 | Stark et al. | 715/727 |
| 2006/0265369 | A1* | 11/2006 | Atcheson et al. | 707/5 |
| 2007/0073837 | A1* | 3/2007 | Johnson-McCormick et al. | 709/217 |
| 2007/0074618 | A1* | 4/2007 | Vergo | 84/612 |
| 2007/0244880 | A1* | 10/2007 | Martin et al. | 707/5 |
| 2009/0076881 | A1* | 3/2009 | Svendsen | 705/10 |

* cited by examiner

*Primary Examiner* — Boris Pesin
*Assistant Examiner* — Ayesha Huertas Torres
(74) *Attorney, Agent, or Firm* — Ditthavong Mori & Steiner, P.C.

(57) ABSTRACT

A system and method for providing content offering recommendations to users based on the users' preferences. Content offerings may be assigned to a primary metagenre and one or more sub-genres, as well as a secondary metagenre (and additional sub-genres if desired). The offerings may also be identified by their source, and this information can be used with the primary/secondary metagenre/sub-genre data to prepare a listing of recommended files. The listing may be generated by first generating three match listings: 1) a strong genre match listing identifying those offerings that match two user preferred metagenres; 2) a genre/style match listing identifying those offerings whose primary metagenre and corresponding sub-genre are preferred by the user; and 3) a weak genre match listing identifying those offerings whose primary metagenre matches a user preference, but whose secondary metagenre does not. These listings may be combined, redundancies may be removed, and a subset may be presented to the user as a recommendation list.

28 Claims, 8 Drawing Sheets

MEDIA RECOMMENDATION SYSTEM AND METHOD

FIELD OF THE SPECIFICATION

The present application relates generally to the field of providing users with targeted listings of offerings, such as audio and/or video media, based on user preference.

BACKGROUND

The soaring popularity of online music providers and Internet distribution of music has opened a floodgate of new artists and offerings. Individual artists and musicians, who previously could not afford the cost of a major record label distribution network, can now upload their own offerings to various Internet services and offer them for download and distribution. Accordingly, the typical listener has a vast and growing array of music offerings from which to choose.

Not surprisingly, navigating through this array of music offerings is becoming more difficult. With so many choices, users must spend time wading through the offerings, and many times users miss learning of new releases because they simply did not have the time to get through all of the other new releases. Some users may help cut down on the number of offerings they consider by focusing, for example, on their favorite musicians, but that limits their ability to learn of other types of music that they may also enjoy.

SUMMARY

The present application provides systems and methods that can help ensure that users learn of offerings that match their interests, and that they also have the opportunity to expand those interests into other areas.

A recommendation offering system can receive offerings, such as song recommendations, from a variety of different sources. The system can store metadata for the offerings, identifying primary metagenre, a sub-genre of the primary metagenre, and a secondary metagenre of the offering.

The system can then receive user preference information identifying a plurality of metagenres preferred by a user, and at least one preferred sub-genre for each preferred metagenre. With this information, the system can generate three match listings. The system can generate a strong genre match listing of content offerings whose primary and secondary metagenre data match the user's preferences; a genre/style match listing of content offerings whose primary metagenre data and corresponding sub-genre data match the user's preferences; and a weak genre match listing of content offerings whose primary metagenre data matches the user's preferences, but whose secondary metagenre data does not match the user's preferences. These three listings may then be combined to generate recommendations for the user.

In some aspects, the metadata values further include information identifying recommenders of content offerings, and generating the strong genre match listing (or the other match listings) further comprises ordering the strong genre match listing to minimize adjacent offerings having common recommenders. Similarly, the match listing may also be ordered to minimize adjacent offerings having common metagenres.

In some aspects, the metadata values further include a ranking identifying how conventionally an offering fits in its primary metagenre, and the match listings can be sorted by this ranking.

The combining of the listings may include removing redundant entries, and may be done sequentially by taking the first entry of each listing, then the second, and so on.

In some aspects, the combining of the listings can be performed before the match listings are ordered to minimize adjacent offerings having common metagenres and/or recommenders.

BRIEF DESCRIPTION

A more complete understanding of the features described herein and the advantages thereof may be acquired by referring to the following description in consideration of the accompanying drawings, in which like reference numbers indicate like features, and wherein.

DETAILED DESCRIPTION

In the following description, reference is made to the accompanying drawings, which form a part hereof, and in which is shown by way of illustration various features that may be used. It is to be understood that other embodiments may be utilized and structural and functional modifications may be made without departing from the scope and spirit of the present application.

Figure 1:
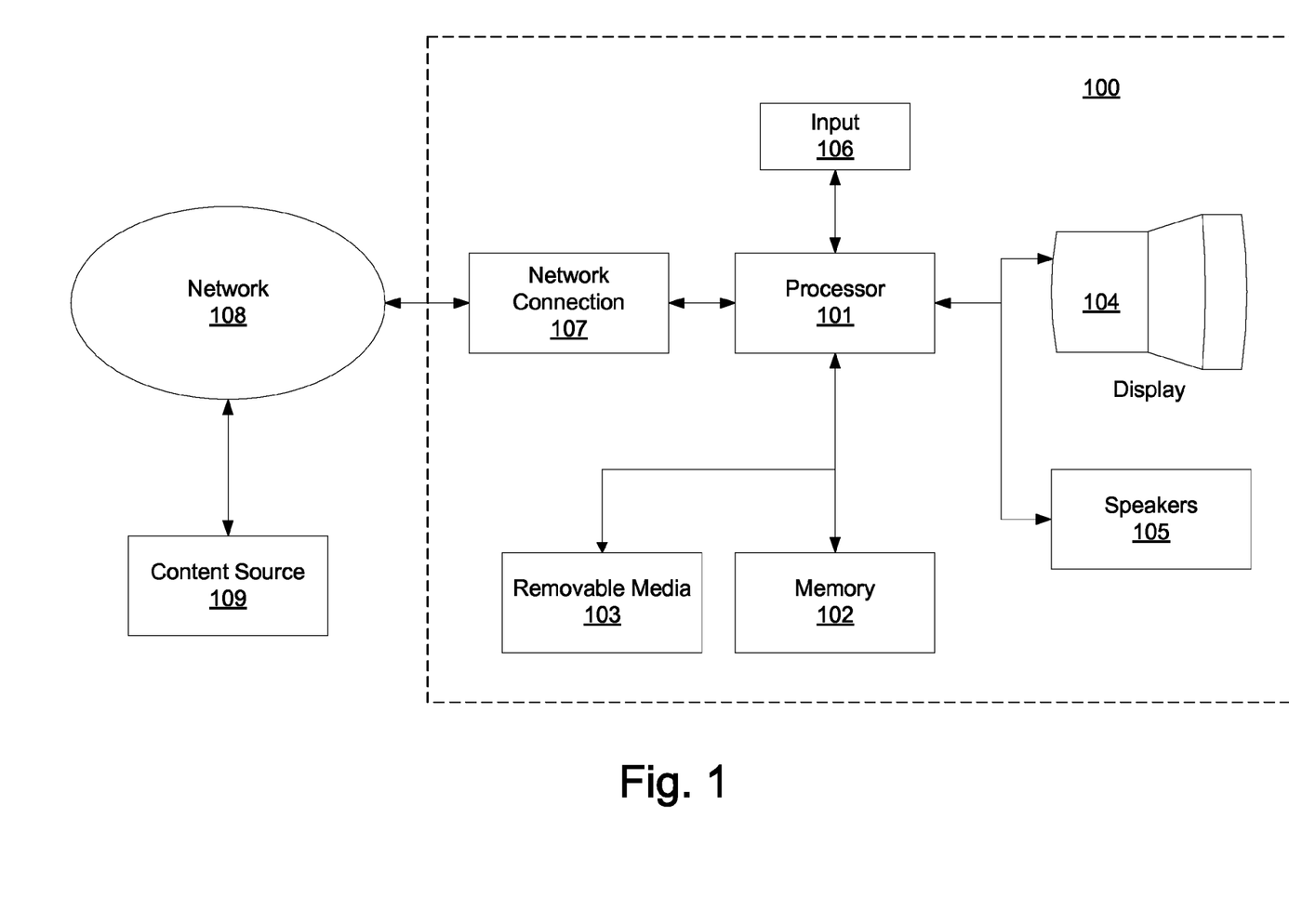
FIG. 1 illustrates basic components of a computing system on which features described herein may be implemented.

FIG. 1 illustrates, in one aspect described herein, basic components of a computing system on which features described herein may be implemented. The system 100 may take the form of a general purpose computer, such as a personal computer.

Alternatively, system 100 may be implemented as any other fixed or mobile electronic device, such as a mobile cellular telephone, mobile communication device, personal data assistant (PDA), pager, TV device, music player, AM/FM/digital radio receiver, video player, etc.

The system 100 may have one or more processors 101, such as a programmable logic device, that may execute instructions to provide features described herein. The instructions may be stored as computer-readable instructions on one or more memory devices 102, which may be dynamic and/or static random access memories (RAM), read-only memories (ROM), magnetic or optical disk, or any other desired computer-readable storage device. The system 100 may also include one or more removable media 103 that can also store any of the data described herein (e.g., computer-readable instructions, data described below, etc.). The removable media 103 may be any desired type, such as removable FLASH memory, disk drives, optical or magnetic disks, etc.

The system 100 may be used to provide media offerings, such as recommendations and/or media files/tracks to users. The offerings may be any type of transmittable data, such as electronic data files for audio and/or video programs, television shows, movies, songs, books, images, text, presentations, Internet links (URL), ESG (Electronic Service Guide) or EPG (Electronic Program Guide) fragments, etc. For example, the data may represent audio tracks or songs that the user may wish to hear. Accordingly, the system 100 may include one or more output devices to provide such offerings to the user. The output devices may include video output devices, such as a display 104, which can display menu choices, interactive displays, video, or any other visible information to the user. The output devices may also include one or more speakers 105, which can be used to play audio tracks or songs for the user.

To interact with the user, the system 100 may also include one or more user input devices 106. The user input devices 106 may be, for example, alphanumeric push buttons on a keyboard (e.g., desktop computer keyboard, mobile telephone keypad, etc.), touch and/or capacitive-sensitive pads on a laptop, computer mouse, trackball, stylus on a sensitive input area or display, etc.

The offerings may be provided to the system 100 through a network connection 107. Network connection 107 may be any form of computer interface. For example, a personal computer 100 may be connected to the Internet through a wireless interface (such as WLAN, Bluetooth, WIMAX), Ethernet wired connection, cable modem, etc., and network connection 107 may include any of these elements. If system 100 is implemented in a mobile telephone, network connection 107 may include the radio-frequency (RF) wireless circuitry used to allow the phone to communicate data to and from an external cellular telephone network. If system 100 is implemented in an audio/video player or TV device the network connection 107 may include circuitry and/or receiver used to allow the system to receive signals from analog/digital radio/video/TV networks. The network 108 to which the system 100 communicates may then be the Internet, a telephone network (e.g., mobile or public-switched), cable television, satellite, or any other desired network.

The source of the offerings may be a content source 109 that is also communicatively coupled to the network 108. Content source 109 may be a service provider computer server having a storage (not shown) of an array of downloadable content. Source 109 may include some or all of the same components in the system 100.

As noted above, features described herein may allow users to more quickly view offerings that may be of interest to them. To support such a feature, the offerings may be stored in a memory (e.g., at the content source 109) with sufficient metadata to allow filtering of the various offerings based on user preferences, as will be described below.

To allow for the sorting, searching, and presentation of offerings, the various offerings may first be defined with descriptive metadata. A hierarchy of genres or classifications may be used to delineate the offerings. For example, the offerings may first be divided into one or more broad categories depending on the type of offering involved. In the case of music, metagenres may be broad categories of music, such as Classical, Country, Asian Pop, Western Pop, Hip-Hop, Jazz/Blues, Latin/Brazilian, Dance, Reggae, Rock, R&B/Soul and World Music. Other types of classifications may be used for the metagenre, depending on the desired organization and type of offering. For example, offerings of television programming content may be based on types of television show (e.g., comedy, drama, feature movie, news, etc.).

Each metagenre may have a number of sub-genres, or styles, to further delineate content within that metagenre. For example, the broader metagenre of "Classical music" may have sub-genres or styles of different types of classical music. For example, the Classical Music metagenre might have styles of Orchestral, Opera, Choral, Chamber, Experimental, and any other desired sub-category. Other examples of metagenres and their sub-genres or styles include the following from the example metagenres given above: Country (Alternative, Popular, Bluegrass, Traditional); Asian Pop (Canto/Mandarin/Korean, Japanese, Indian, British Indian, Southeast Asian); Western Pop (Euro Dance, Singer/Songwriter, R&B, Guitar/Band); Hip-Hop (Underground/Independent, Mainstream, Gangsta, Experimental); Jazz/Blues (Vocal Jazz, Popular Classic and Jazz, Experimental Jazz, Blues Rock, Folk Blues); Latin/Brazilian (Jazz, Rock and Pop, Electronic, Urban, Folk and Traditional); Dance (Electronica Minimal, Soulful and Funky, Drum 'n' Bass/Breaks, Downbeat/Nu Jazz, Hard); Reggae (Roots/Dub, Dancehall, Ska/Lovers, Soca/Calypso); Rock (Hard Rock and Metal, Garage Rock, Singer Songwriter and Popular, Punk and Hardcore, Indie/Alternative); R&B/Soul (Nu Soul, Modern R&B, Funk, Classic and Traditional); and World Music (Afro Pop, Afro Jazz, Popular Arabic/Middle Eastern, Folk).

Figure 2:
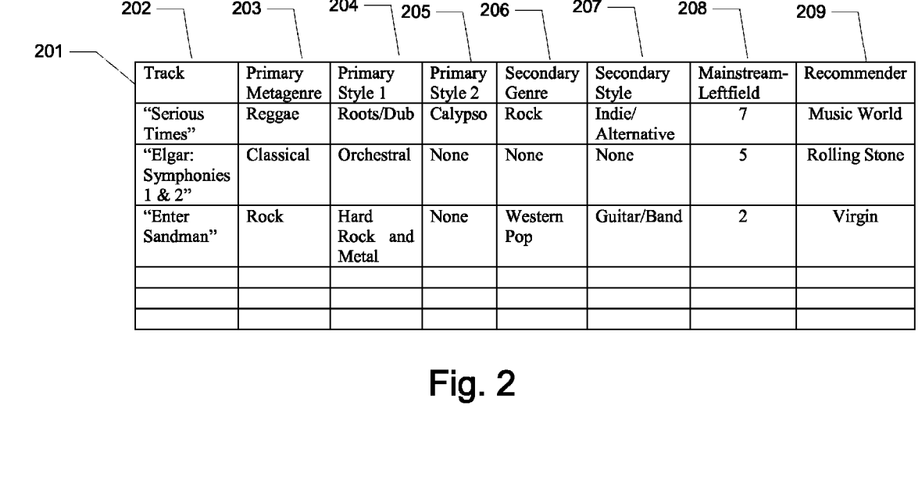
FIG. 2 illustrates a data structure that may be used with the features described herein.

FIG. 2 illustrates, in one aspect, an example data format that may be used for entertainment content, such as musical offerings or audio tracks. The individual tracks may be stored as separate files on a storage device, such as in a compressed audio format. The data 201 may be a table of metadata relating to those tracks. The data 201 may include a variety of parameters for the tracks. The parameters may include a track name 202, which may be a textual name, code, address location, or other identifier to uniquely identify the track. The parameters may include the classification data noted above. For example, the data 201 may include an identification of a primary metagenre 203 to which each track is assigned. The first example shown in FIG. 2 is of a track titled "Serious Times," and is classified as a Reggae song. The data 201 may also include a sub-genre or style classification 204. In the first example of FIG. 2, the Reggae song is classified as a type of reggae known as "Roots/Dub." Songs may often times fall into multiple categories, and the data 201 captures that information. The data 201 may include a primary style identifier 204 and a secondary style identifier 205. Any number of styles may be used.

Along the same lines, songs may sometimes fall into more than one of the broad, metagenre categories. Accordingly, data 201 may include an identification of a secondary genre 206 and a secondary style 207. In the "Serious Times" example of FIG. 2, that song has been given a secondary genre of "Rock," to indicate that the creator of the data 201 considers that song to also be a "Rock" type of song (and that it is an "Indie/Alternative" type of rock song). If desired, multiple additional genre and style classifications may be assigned to the given song.

Another piece of information classifying the track or song in the FIG. 2 example is a ranking on a "Mainstream/Leftfield" scale 208. The Mainstream/Leftfield scale may be a numerical value (or other ranked value) identifying, on a relative scale, how conventional the given track is to its assigned primary metagenre. For example, if the "Serious Times" song shown in FIG. 2 is a more traditional reggae song, it may be given a more "mainstream" ranking than other reggae songs that are less conventional. The ranking may use a number (e.g., scale of 1 to 10), with a low number assigned to the more conventional ranking. This can be implemented in any manner desired, so the ranking may use a high number for the more conventional ranking, or it may choose not to use numbers at all (e.g., letter grades, stars, etc.). The numerical value can be given by a recommender. Alternatively, the style or sub-genre information (such as "Roots/Dub") may itself provide enough indication within a metagenre that a specific song has more or less mainstream or leftfield characters. For example, some sub-genres may automatically be deemed to be more mainstream than other sub-genres. Further, the user may define what are mainstream and leftfield styles or sub-genres for her/him by, for example, providing user input to assign a mainstream/leftfield ranking to a particular sub-genre or style.

The data 201 may also include a Recommender field 209 identifying a source of the offering, such as a track. As will be described below, features described herein may be implemented in a system or service that receives its tracks from multiple different sources. The Recommender field 209 may identify the particular source that supplied, or recommended, the given track. The field 209 may be a textual identification, numeric code, unique ID, name of person, name of store, link, or any other data that can identify the source. Additionally, the data 201 may include columns for number of total recommendations of all recommenders per track, DRM (Digital Rights Management) and/or licensing information (i.e. user rights and/or usage period for a specific content), additional metadata information (such as album, artist, duration, file type, rating, etc.), web links, storage/access location, and/or addresses to supplemental content (such as images, lyrics, video, commentaries, alternative subtitles, etc.).

The various tracks that are listed in the data 201 need not have an entry for every available type of metadata. For example, the "Elgar: Symphonies 1 & 2" song in FIG. 2 is shown without a "Primary Style 2," "Secondary Genre," or "Secondary Style," while the song "Enter Sandman" has no "Primary Style 2" but does have a "Secondary Genre" and "Secondary Style" classification.

Figure 3:
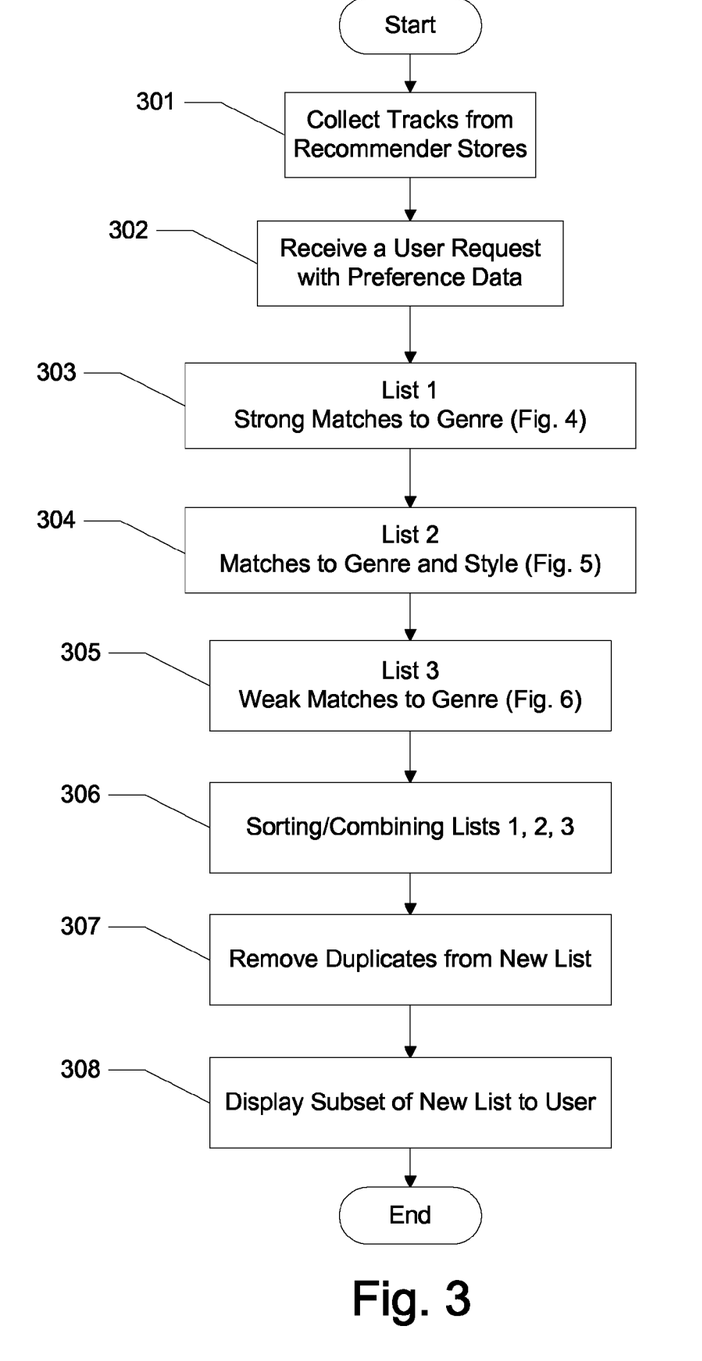
FIG. 3 illustrates a method of identifying offerings for a user.

FIG. 3 illustrates, in one aspect, an example method by which users can be offered media offerings, such as recommendations and/or media files/tracks, according to their preferences. The content may first be collected in step 301 by source 109, which may be a service, from a variety of recommender sources. For example, individual sources may be allotted a predetermined amount of recommendations for a given time frame (e.g., 10 song recommendations per month). As part of the collection, the source 109 may assign the metadata values found in data table 201. Alternatively, the metadata may be supplied by the recommender sources.

At step 302, the source 109 may receive a user request to view available content using the user's preferences. The request, and preferences, may be obtained in any desired manner. For example, the source 109 may offer its content via a web service or Internet page, and users may maintain an account to access the content. The users may log onto the Internet page, and may supply user preferences using the page. The preferences may be stored in source 109 memory as a profile for the user, and may include identification of one or more metagenres and styles of song that the user prefers. The user may click on an onscreen user interface element to request a listing of recommended songs.

In steps 303, 304 and 305, the system (e.g., at source 109) may generate three different lists as an initial part of the recommendation process. The lists (List 1, List 2, and List 3) and their generation are described in greater detail with respect to FIGS. 4-6. Although these steps are shown in order (303, 304 then 305), these steps (and indeed, other steps as well) may be rearranged in other desired orders—FIG. 3 is simply an example. For example, these steps may all be performed in parallel or simultaneously, so that each step begins with the same set of original data.

The three lists generated in steps 303, 304 and 305 will be listings of songs in an order determined by their generation. In step 306, these three lists may be combined. In one embodiment, the combination may sequentially add tracks from each of the lists to a new list. For example, the first element of each list may be added (e.g., first element of List 1, followed by first element of List 2, and then the first element of List 3), followed by the second element of each list, and so on until all elements from the three lists have been added to the new list. Alternatively, the user may be prompted to provide or select the manner in which the lists are combined. The user can identify one or more types of metadata fields that are to be dispersed (e.g., the user can select "Secondary Metagenre," and the combining will avoid placing entries with the same Secondary Metagenre adjacent to one another in the combined list. For example, the combination may be done so that no similar primary metagenre, secondary metagenre, and/or style/sub-genre, or any user selectable combination of aforementioned are sequentially places on the combined list. This way the user can have more variety on the results that are still within her/his preferences. Other embodiments of combining the lists are a) mix tracks by metagenres evenly through the list so that no sequential tracks have the same primary genre, and/or b) mix tracks by recommender information evenly through the list so that sequential tracks have the same recommender information.

Alternatively, or additionally, the sorting and combining in step 306 may take into account the number of times a particular piece of content has been recommended, or the number of recommenders that recommended that content. For example, tracks that have been recommended the most, or more than a predetermined number of times, may be moved up towards the top of List 1, List 2, or List 3, and may also be moved towards the top of the combined list. In some aspects, this may be implemented by incorporating the number of times a track has been recommended into the sorting in steps 402, 502 and 602 (e.g., using that count as a tie breaker, or even giving it priority over the mainstream/left field ranking).

In step 307, the new list may then be modified to identify and remove duplicate entries. For example, a given track may appear in List 1 and List 3, and may end up appearing twice in the new list generated in step 306. As noted above, the steps described herein may be rearranged as desired, for example, step 307 may be before step 306, and some steps may be omitted.

The user may then be presented with the list as a recommendation list. The display in step 308 may show a selected subset of a predetermined number for a predetermined time period, such as ten songs for a given month. The entire new list may also be provided to the user on request.

Figure 4:
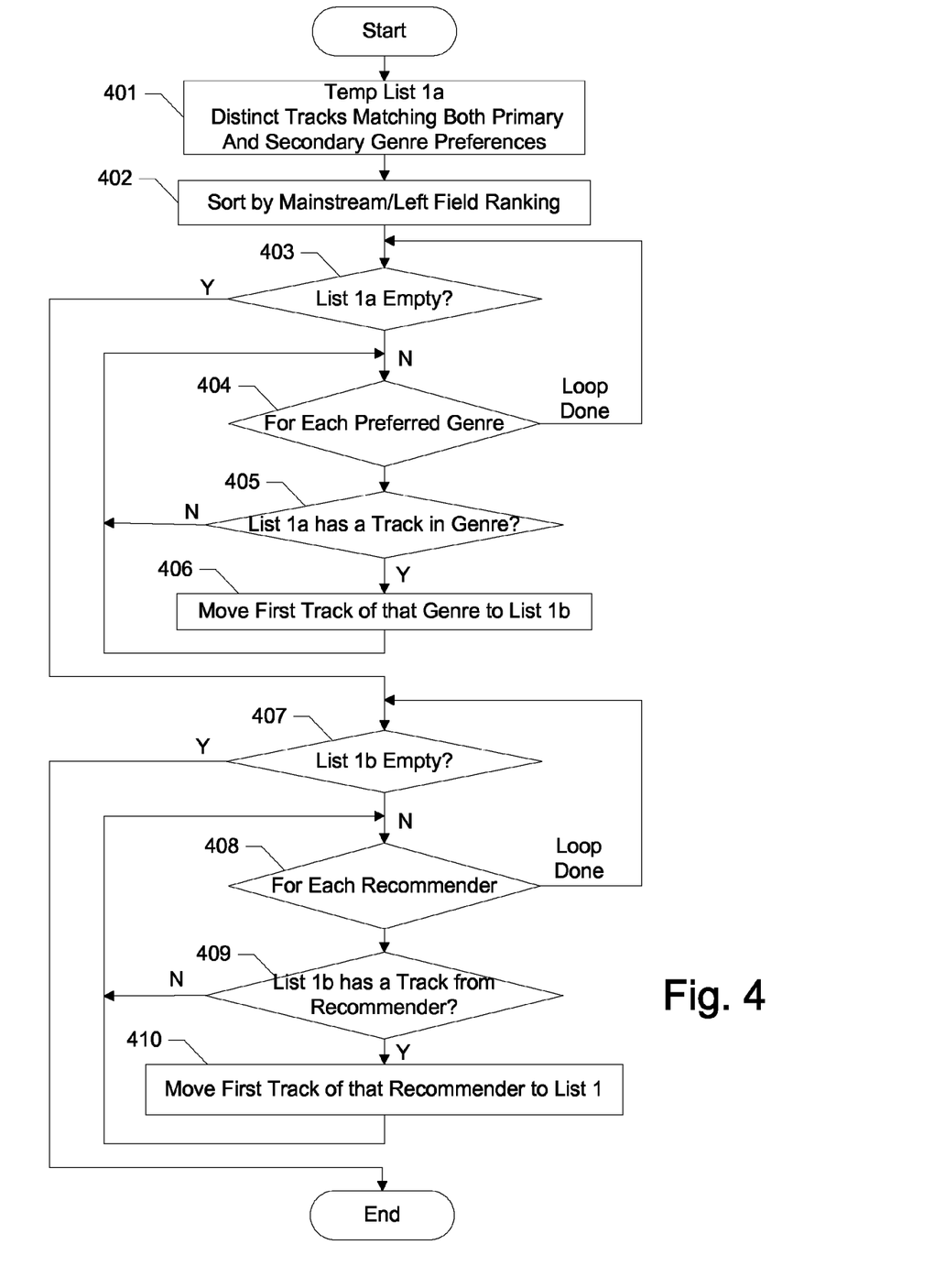
FIGS. 4-6 illustrate methods of generating lists used in the method of FIG. 3.

Returning to step 303, the first list (List 1) is a list of those tracks that are strong matches to the user's preferences for metagenre. Strong matches may occur when a track has two or more metagenre classifications that are both identified as preferred metagenres in the user's preference data. If a track is only assigned one metagenre, and it matches a user preference, the system may default to calling that a weak metagenre match (insufficient for a strong match). Alternatively, the user may decide how strong a strong match must be (e.g., indicating whether it must match two metagenre preferences). FIG. 4 illustrates an example method by which List 1, or the "strong match to genre" list, may be generated.

In step 401, the source 109 may consult its available tracks to identify those tracks that match two or more of the user's preferred metagenres. This can be accomplished by comparing the track's metadata with the user preferences submitted by the user in step 302. For example, the first song in FIG. 2 has a "Reggae" primary metagenre, and "Rock" secondary metagenre—this song would be a match if the user's preferences included both "Reggae" and "Rock" as preferred metagenres. Those tracks that match may be placed in a first temporary list, and redundant entries may be removed from this temporary list, such that it only lists distinct tracks that match two of the user's preferred metagenre values.

In step 402, the first temporary list is sorted by the "Mainstream/Left Field" ranking. This sort may place those tracks with the highest ranking (e.g., most mainstream) at the top of the list (e.g., first in the list).

In step 403, a looping process is begun and continues until the first temporary list is empty. Within this looping process, a nested looping process begins in step 404 to address each of the user's preferred metagenres once per pass. In step 405, the first temporary list is checked to see if it contains one or more tracks that match the preferred metagenre under consideration. If there is such a track, then the first such track is moved in step 406 from the first temporary list to a second temporary list. For example, if the user had identified three preferred metagenres, the looping process in steps 404-6 would give each preferred metagenre a chance to move one song from the first temporary list to the second temporary list.

When each metagenre has been given this chance (i.e., steps 404-406 performed once), the process returns to step 403 to see if more entries remain in the first temporary list, and if more remain, the looping process of steps 404-406 repeats again, giving each metagenre another chance to move one track. These looping processes continue until all elements from the first temporary list have been moved to the second temporary list. The resulting second temporary list will list the various tracks in an order that avoids having two adjacent tracks of the same metagenre (except towards the end of the list, if one metagenre had more songs in the first temporary list than the other metagenres).

At step 407, a second looping process is applied that considers the source of the listed files (the Recommender field 209). This time, the looping process addresses the second temporary list, and moves elements from that list into the final List 1 (the strong genre match list) based on the Recommender field 209. Step 407 begins a looping process that continues until the second temporary list is empty. With each pass in this looping process, a nested loop beginning at step 408 gives each recommender a chance to have one of its recommended songs moved into the final List 1. This nested loop checks, in step 409, whether the second temporary list includes a track by the current recommender, and if it does, the process moves the first such track from the second temporary list to the final List 1 in step 410.

The nested loop in steps 408-410 continues until all entries from the second temporary list have been moved to the final List 1. At that time, the process concludes, and List 1 is ready for use. The end result here, List 1, lists the distinct matching tracks so that common recommender neighbor listings are minimized—e.g., songs are not adjacent to other songs from the same recommender (at least until the latter portions of the list, if one recommender happens to have recommended more songs than others). The listing also minimizes the chance that listed tracks will have neighbor tracks of the same metagenre, although this scattering will be reduced by the recommender scattering in steps 408-410.

Figure 5:
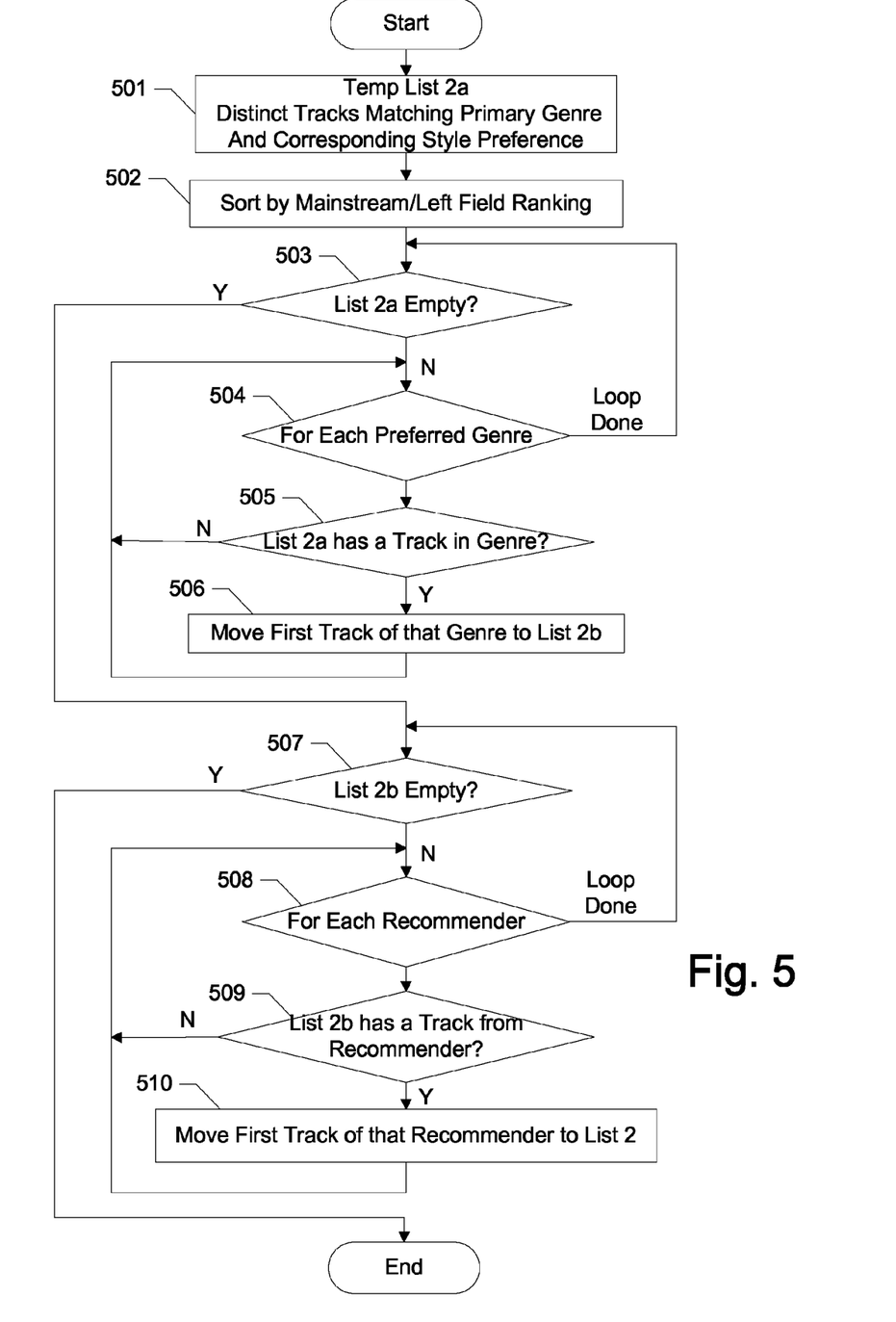

The generation of List 2 (the genre and style match list) in FIG. 5 resembles the process shown in FIG. 4 for List 1, although it begins with a different data set. In step 501, the system identifies the tracks whose primary metagenre and associated sub-genre or style matches one of the user's preferred metagenres and sub-genres/style pairs. For example, the first song in FIG. 2 has a primary metagenre of "Reggae" and primary styles of "Roots/Dub" and "Calypso." This song would be a match in step 501 if the user's preferences include "Reggae" as a preferred metagenre and at least one of "Roots/Dub" and "Calypso" as preferred Reggae styles. Note that a match of primary styles may be had if just one of the styles is a preferred style.

Those matching tracks are listed in a first temporary list, and redundant entries may be removed as well. The resulting first temporary list would then list the distinct tracks that match the user's preferred metagenre and at least one preferred sub-genre or style. The remainder of the steps resemble the FIG. 4 generation of List 1.

In step 502, the first temporary list is sorted by the "Mainstream/Left Field" ranking. This sort may place those tracks with the highest ranking (e.g., most mainstream) at the top of the list (e.g., first in the list).

In step 503, a looping process is begun and continues until the first temporary list is empty. Within this looping process, a nested looping process begins in step 504 to address each of the user's preferred metagenres once per pass. In step 505, the first temporary list is checked to see if it contains one or more tracks that match the preferred metagenre under consideration. If there is such a track, then the first such track is moved in step 506 from the first temporary list to a second temporary list. For example, if the user had identified three preferred metagenres, the looping process in steps 504-6 would give each preferred metagenre a chance to move one song from the first temporary list to the second temporary list.

When each metagenre has been given this chance (i.e., steps 504-506 performed once), the process returns to step 503 to see if more entries remain in the first temporary list, and if more remain, the looping process of steps 504-506 repeats again, giving each metagenre another chance to move one track. These looping processes continue until all elements from the first temporary list have been moved to the second temporary list. The resulting second temporary list will list the various tracks in an order that avoids having two adjacent tracks of the same metagenre (except towards the end of the list, if one metagenre had more songs in the first temporary list than the other metagenres).

At step 507, a second looping process is applied that considers the source of the listed files (the Recommender field 209). This time, the looping process addresses the second temporary list, and moves elements from that list into the final List 2 (the genre and style match list) based on the Recommender field 209. Step 507 begins a looping process that continues until the second temporary list is empty. With each pass in this looping process, a nested loop beginning at step 508 gives each recommender a chance to have one of its recommended songs moved into the final List 2. This nested loop checks, in step 509, whether the second temporary list includes a track by the current recommender, and if it does, the process moves the first such track from the second temporary list to the final List 2 in step 510.

The nested loop in steps 508-510 continues until all entries from the second temporary list have been moved to the final List 2. At that time, the process concludes, and List 2 is ready for use. The end result here, List 2, lists the distinct matching tracks so that common recommender neighbor listings are minimized—e.g., songs are not adjacent to other songs from the same recommender (at least until the latter portions of the list, if one recommender happens to have recommended more songs than others). The listing also minimizes the chance that listed tracks will have neighbor tracks of the same metagenre, although this scattering will be reduced by the recommender scattering in steps 508-510.

Figure 6:
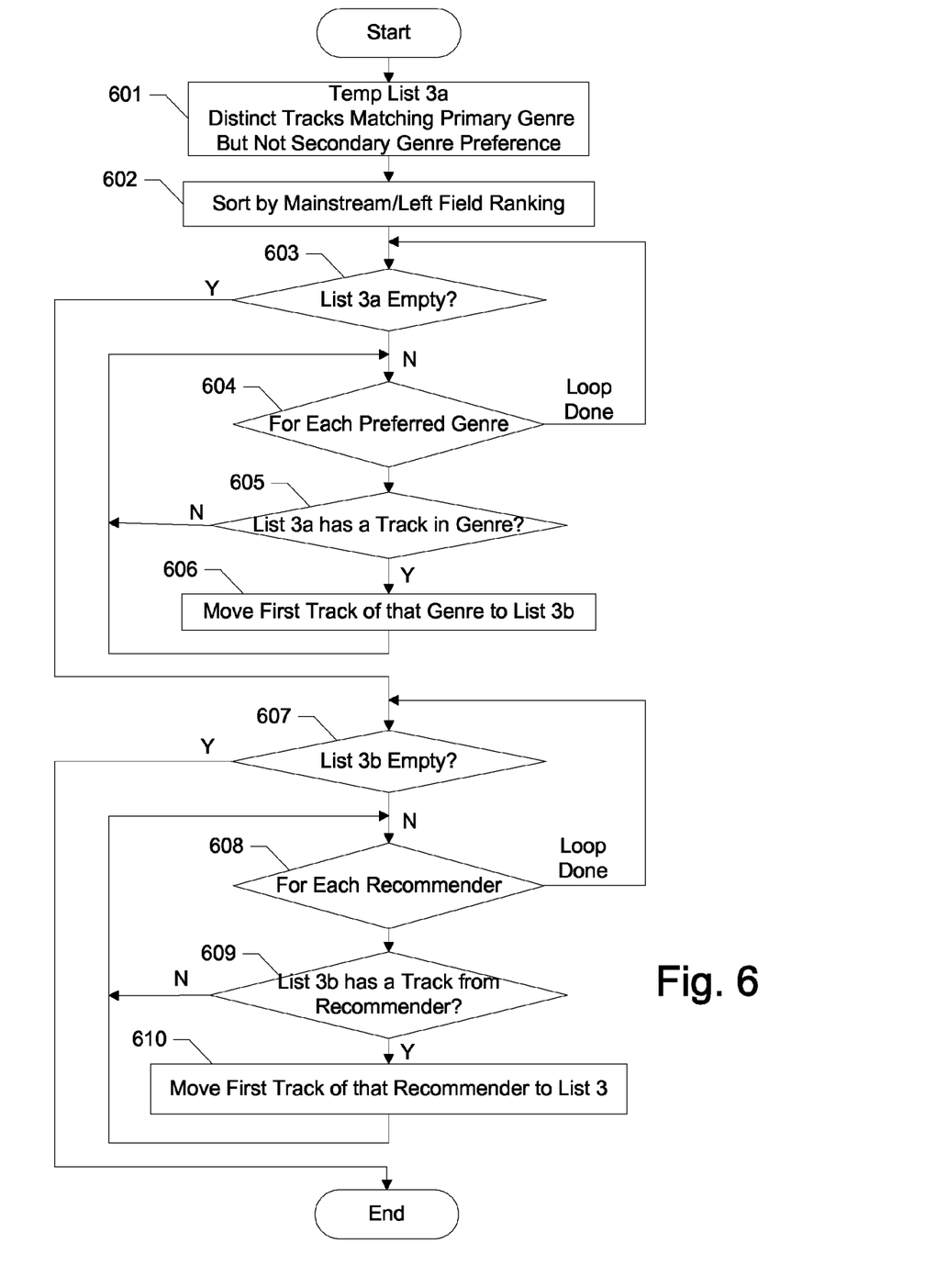

FIG. 6 illustrates the generation of the third list, List 3 (the weak genre match list). In step 601, the system may identify the tracks that have a primary metagenre that matches a user's preferred metagenres, but that also have a secondary metagenre that fails to match the user's preferred metagenres. These matching tracks are placed in a first temporary list, and redundant entries may be removed. The remainder of the process resembles the generation of List 1 and List 2.

In step 602, the first temporary list is sorted by the "Mainstream/Left Field" ranking. This sort may place those tracks with the highest ranking (e.g., most mainstream) at the top of the list (e.g., first in the list).

In step 603, a looping process is begun and continues until the first temporary list is empty. Within this looping process, a nested looping process begins in step 604 to address each of the user's preferred metagenres once per pass. In step 605, the first temporary list is checked to see if it contains one or more tracks that match the preferred metagenre under consideration. If there is such a track, then the first such track is moved in step 606 from the first temporary list to a second temporary list. For example, if the user had identified three preferred metagenres, the looping process in steps 604-6 would give each preferred metagenre a chance to move one song from the first temporary list to the second temporary list.

When each metagenre has been given this chance (i.e., steps 604-606 performed once), the process returns to step 603 to see if more entries remain in the first temporary list, and if more remain, the looping process of steps 604-606 repeats again, giving each metagenre another chance to move one track. These looping processes continue until all elements from the first temporary list have been moved to the second temporary list. The resulting second temporary list will list the various tracks in an order that avoids having two adjacent tracks of the same metagenre (except towards the end of the list, if one metagenre had more songs in the first temporary list than the other metagenres).

At step 607, a second looping process is applied that considers the source of the listed files (the Recommender field 209). This time, the looping process addresses the second temporary list, and moves elements from that list into the final List 6 (the weak genre match list) based on the Recommender field 209. Step 607 begins a looping process that continues until the second temporary list is empty. With each pass in this looping process, a nested loop beginning at step 608 gives each recommender a chance to have one of its recommended songs moved into the final List 3. This nested loop checks, in step 609, whether the second temporary list includes a track by the current recommender, and if it does, the process moves the first such track from the second temporary list to the final List 3 in step 610.

The nested loop in steps 608-610 continues until all entries from the second temporary list have been moved to the final List 3. At that time, the process concludes, and List 3 is ready for use. The end result here, List 3, lists the distinct matching tracks so that common recommender neighbor listings are minimized—e.g., songs are not adjacent to other songs from the same recommender (at least until the latter portions of the list, if one recommender happens to have recommended more songs than others). The listing also minimizes the chance that listed tracks will have neighbor tracks of the same metagenre, although this scattering will be reduced by the recommender scattering in steps 608-610.

As noted above, these three lists (the strong genre match, the genre/style match, and the weak genre match) may then be combined in step 306 by sequentially taking one entry from each and adding it to a new list. The combined list may then be used to provide the user with a set of recommended tracks that meets the user's preferences, but also is not overly restrictive to those preferences.

Figure 7:
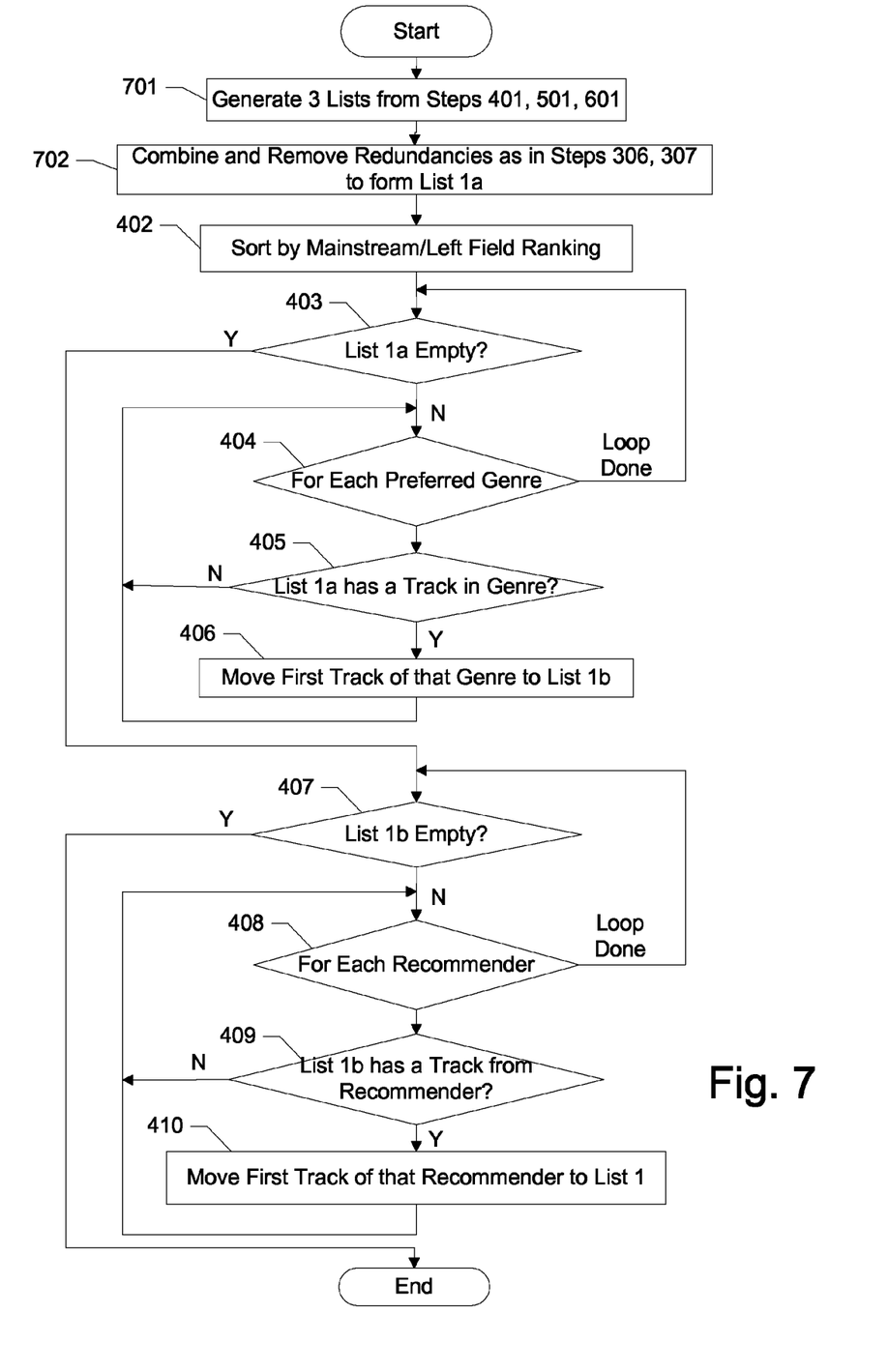
FIG. 7 illustrates an alternative method of identifying offerings for a user.

Although the various steps are detailed above, the same objective (e.g., generating the end list with the three lists) can be accomplished through modified versions of the depicted methods that rearrange, remove and/or modify the described steps. For example, although the processes in FIGS. 4-6 handle the genre commonalities before the recommender commonalities, the order of those two loopings can be reversed. As another example, the combining in step 306 could actually be performed after steps 402, 502 and 602, so that the combined listing is used as the first temporary list in the FIG. 4 process. FIG. 7 illustrates such an example rearrangement, with steps 701 and 702 corresponding to the combined steps 306, 307, 401, 501 and 601 (preserving step numbers). Additionally, the features above may be implemented in the form of computer-executable instructions that cause a computer, or processor 101, to perform the steps described above.

Figure 8:
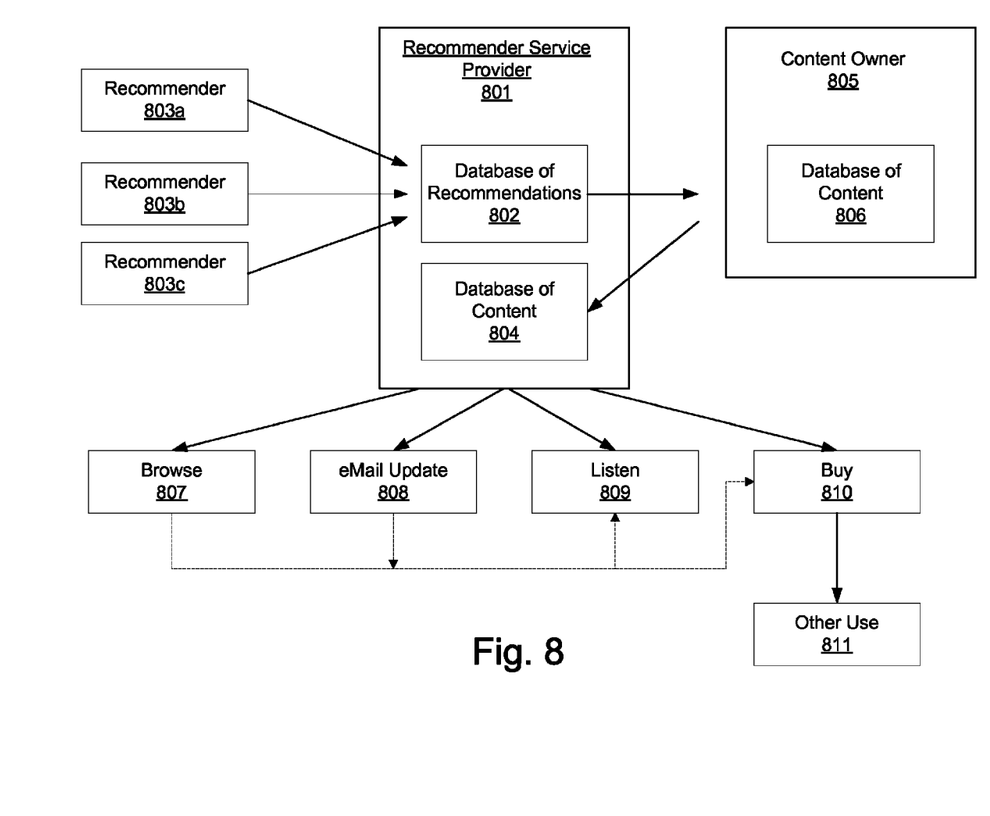
FIG. 8 illustrates an example service provider structure using one or more of the features described herein.

The various features described above can be used to offer and recommend services to customers or users. FIG. 8 illustrates an example of how such services can be rendered, for example, by source 109. A service provider 801 may be a web service, such as an Internet page, or any other networked service, that offers users and/or customers recommendations as to available content. The service provider 801 may have subprocesses or subservers to collect and store recommendations, acquiring necessary licenses for distributing content, requesting, storing and managing metadata for the content offerings, requesting additional content information when needed, storing customer information, etc. The recommendation process from FIG. 3 may be carried out at the server 801.

The server 801 may store a database of recommendations 802 that it receives from various recommenders 803a-c. The recommenders 803a-c may be persons, fans, customers, music stores, publishing labels, etc. who wish to recommend certain content to others. The server 801 may also store a database of the content 804, such as audio tracks, which it may recommend and/or distribute.

In many cases, the content offerings are licensed from the content owner 805, who may also have a database of content 806. For example, one music publisher may be a content owner, and may have a database of the various songs available through the service provider 801 (which may be an Internet site offering music).

Service provider 801 may perform its recommendation process (e.g., FIG. 3) on its own initiative, or in response to a user request (e.g., a user logging into the service provider 801 web site and asking to see recommendations). For example, one user 807 (who may be accessing the service provider 801 through any communication network, such as cellular telephone, Internet, WAN, LAN, etc.) may simply wish to browse the available offerings at the service provider 801 website. The user may enter one or more preferences, communicate that to the provider 801, and the provider 801 can respond with its recommendations using the processes described above. The provider 801 may offer search capabilities to allow keyword text searches to find content (e.g., author, musician, lyric, song title, album title, etc.), and may allow the user to define a personal profile containing that user's preferences. The user's profile may be stored at the service provider 801, such as with the database 802 or 804.

The service provider 801 can also automatically provide recommendations in response to other predetermined conditions. For example, the provider 801 may be configured (e.g., by the user or other entity) to automatically provide recommendations after the passage of a predetermined amount of time, such as sending a user an email once a month with current recommendations based on the user's preferences. The monthly update may include an Internet link to a "my recommendations" page, listing the recommendations generated for the user (and which may include more recommendations than were sent in the email update). An email update user 808 and browsing user 807 may access the content, such as listening to it 809, and may choose to purchase it 810. Once purchased, the user may be permitted to use the content on other devices 811, such as a mobile phone, television, stereo, portable music player, etc. For example, the user may initially purchase the content on a personal computer (PC), but may be permitted to synchronize or share the content with the user's personal music player.

The user may be permitted to store one or more playlists on the service provider 801 memory, such as with database 802 or 804, for later reference and/or purchase.

To help manage the service, the service provider 801 may provide a limit to the number of recommendations that any given recommender 803*a-c* can supply in a given month. The service provider 801 may also select a subset of received recommendations for actual use.

The illustrative features described above are examples. The scope of the present application should not be limited to require all described features, but should rather only be limited by the claims that follow.

We claim:

1. A method, comprising:

causing, at least in part, storing at an apparatus metadata values for each of one or more content offerings, each offering having metadata identifying a primary metagenre, a sub-genre of said primary metagenre, a secondary metagenre, one or more recommenders, and rankings assigned to respective metagenres by the recommenders;

receiving at the apparatus user preference information identifying one or more metagenres preferred by a user, and one or more preferred sub-genres for each preferred metagenre;

generating at the apparatus a first genre match listing of said content offerings, by identifying offerings whose primary and secondary metagenre data match the user's preferences, ordering the offerings with highest ranking first, and scattering the offerings per metagenre and per recommender;

generating at the apparatus a second genre match listing of said content offerings, by identifying offerings whose primary metagenre data and corresponding sub-genre data match the user's preferences, ordering the offerings with highest ranking first, and scattering the offerings per metagenre and per recommender;

generating at the apparatus a third genre match listing of content offerings, by identifying offerings whose primary metagenre data matches the user's preferences but whose secondary metagenre data does not match the user's preferences, ordering the offerings with highest ranking first, and scattering the offerings per metagenre and per recommender; and generating at the apparatus a recommendation listing by combining the match listings, the recommendation list eliminates listings having one or more common adjacent metagenres or recommenders, wherein said combining further comprises:

creating a first temporary listing via looping each of the match listings to sequentially add entries based on genre; and creating a second temporary listing via looping the first temporary listing to sequentially add entries based on recommender.

2. The method of claim 1, wherein said plurality of metadata values further includes information identifying the recommenders, and said generating said first, second and third genre match listings further comprises ordering content offerings in said genre match listings to eliminate adjacent offerings having one or more common recommenders.

3. The method of claim 1, wherein said generating said first, second and third genre match listings further comprises ordering said genre match listings to eliminate adjacent offerings having one or more common metagenres.

4. The method of claim 1, further comprising sequentially combining said genre match listings.

5. The method of claim 1, further comprising: receiving inputs of mainstream/leftfield relative rankings to the primary and secondary metagenres, said mainstream/leftfield relative rankings identifying how conventionally said offering fits in a respective metagenre.

6. The method of claim 5, further comprising: sorting the offerings with the highest mainstream/leftfield relative ranking to be at the top of the recommendation list; and incorporating a number of times that at least one of the offerings has been recommended as a tie breaker when two of the offerings have an identical mainstream/leftfield relative ranking.

7. The method of claim 5, further comprising removing duplicate entries from at least one of the first genre match listing, the second genre match listing, the third genre match listing, and the recommendation listing; and displaying the recommendation listing including the mainstream/leftfield relative rankings and the recommenders in a new list.

8. The method of claim 1, wherein said generating said first, second and third genre match listings further comprises ordering content offerings of said genre match listings to eliminate adjacent offerings having one or more common recommenders.

9. The method of claim 1, wherein said content offerings are audio data files, and the recommenders include at least one of users of the list, musical fans, customers of the offerings, music stores, and publishing labels.

10. The method of claim 5, further comprising: sorting the offerings with the highest number of times that at least one of the offerings has been recommended to be at the top of the recommendation list; and incorporating the mainstream/leftfield relative rankings as a tie breaker when two of the offerings have an identical number of recommended times.

11. The method of claim 1, further comprising obtaining DRM (Digital Rights Management) information for said offerings.

12. The method of claim 11, further comprising offering access to one or more media files according to said DRM and said content offering information.

13. A non-transitory computer-readable storage medium carrying one or more sequences of one or more instructions which, when executed by one or more processors, cause an apparatus to at least perform the following steps:

causing, at least in part, storing metadata values for each of one or more content offerings, each offering having metadata identifying a primary metagenre, a sub-genre of said primary metagenre, and a secondary metagenre, one or more recommenders, and rankings assigned to respective metagenres by the recommenders;

receiving user preference information identifying one or more metagenres preferred by a user, and one or more preferred sub-genres for each preferred metagenre;

generating a first genre match listing of said content offerings by identifying offerings whose primary and secondary metagenre data match the user's preferences, ordering the offerings with highest ranking first, and scattering the offerings per metagenre and per recommender;

generating a second genre match listing of said content offerings by identifying offerings whose primary metagenre data and corresponding subgenre data match the user's preferences, ordering the offerings with highest ranking first, and scattering the offerings per metagenre and per recommender;

generating a third genre match listing of content offerings, by identifying offerings whose primary metagenre data matches the user's preferences but whose secondary metagenre data does not match the user's preferences, ordering the offerings with highest ranking first, and scattering the offerings per metagenre and per recommender; and generating a recommendation listing by combining the match listings, the recommendation list eliminates listings having one or more common adjacent metagenres or recommenders wherein said combining further comprises:

creating a second temporary listing via looping each of the match listings to sequentially add entries based on genre; and entries based on genre; and creating a second temporary listing via loop said temporary listing to sequentially add entries based on recommender.

14. The non-transitory computer-readable storage medium of claim 13, wherein said plurality of metadata values further includes information identifying recommenders of said content offerings, and said generating said first, second and third genre match listings further comprises ordering content offerings of said genre match listings to eliminate adjacent offerings having one or more common recommenders.

15. The non-transitory computer-readable storage medium of claim 13, wherein said generating said first, second and third genre match listings further comprises ordering content offerings of said genre match listings to eliminate adjacent offerings having one or more common metagenres.

16. The non-transitory computer-readable storage medium of claim 13, wherein the apparatus is caused to further perform: sequentially combining said genre match listings.

17. The non-transitory computer-readable storage medium of claim 13, wherein the apparatus is caused to further perform: receiving inputs of mainstream/leftfield relative rankings to the primary and secondary metagenres, said mainstream/leftfield relative rankings identifying how conventionally said offering fits in a respective metagenre.

18. The non-transitory computer-readable storage medium of claim 17, wherein the apparatus is caused to further perform: sorting the offerings with the highest mainstrearn/leftfield relative ranking to be at the top of the recommendation list; and incorporating a number of times that at least one of the offering has been recommended as a tie breaker when two of the offerings have an identical mainstream/leftfield relative ranking.

19. The non-transitory computer-readable storage medium of claim 17, wherein the apparatus is caused to further perform: removing duplicate entries from at least one of the first genre match listing, the second genre match listing, the third genre match listing, and the recommendation listing; and displaying the recommendation listing including the mainstream/leftfield relative rankings and the recommenders in a new list.

20. The non-transitory computer-readable storage medium of claim 13, wherein said generating said first, second and third genre match listings further comprises ordering content offerings of said genre match listings to eliminate adjacent offerings having one or more common recommenders.

21. The non-transitory computer-readable storage medium of claim 13, wherein said content offerings are audio data files, and the recommenders include at least one of users of the list, musical fans, customers of the offerings, music stores, and publishing labels.

22. The non-transitory computer-readable storage medium of claim 17, wherein the apparatus is caused to further perform: sorting the offerings with the highest mainstrearn/leftfield relative ranking to be at the top of the recommendation list; and incorporating a number of times that at least one of the offering has been recommended as a tie breaker when two of the offerings have an identical mainstream/leftfield relative ranking.

23. The non-transitory computer-readable storage medium of claim 13, further comprising instructions for obtaining DRM (Digital Rights Management) information for said offerings.

24. The non-transitory computer-readable storage medium of claim 23, wherein the apparatus is caused to further perform: offering access to one or more media files according to said DRM and said content offering information.

25. A method comprising:

storing metadata values for each of one or more content offerings, each offering having metadata identifying a primary metagenre, a sub-genre of said primary metagenre, a secondary metagenre, one or more recommenders, and mainstream/leftfield relative rankings assigned to respective metagenres by the recommenders, said mainstream/leftfield relative rankings identifying how conventionally said offering fits in a respective metagenre;

causing, at least in part, receiving user preference information identifying one or more metagenres preferred by a user, and one or more preferred sub-genres for each preferred metagenre;

generating a first genre match listing of said content offerings whose primary and secondary metagenre data match the user's preferences, by identifying offerings whose primary and secondary metagenre data match the user's preferences, ordering the offerings with highest mainstream/leftfield relative ranking first, and scattering the offerings per metagenre and per recommender;

generating a second genre match listing of said content offerings whose primary metagenre data and corresponding sub-genre data match the user's preferences, by identifying offerings whose primary metagenre data and corresponding sub-genre data match the user's preferences, ordering the offerings with highest mainstream/leftfield relative ranking first, and scattering the offerings per metagenre and per recommender;

generating a third genre match listing of content offerings whose primary metagenre data matches the user's preferences, but whose secondary metagenre data does not match the user's preferences, by identifying offerings whose primary metagenre data matches the user's preferences but whose secondary metagenre data does not match the user's preferences, ordering the offerings with highest mainstream/leftfield relative ranking first, and scattering the offerings per metagenre and per recommender;

combining the match listings to form a recommendation list that eliminates listings having one or more common adjacent metagenres or recommenders; and generating a recommendation listing based on said recommendation list, the recommendation listing including information identifying one or more recommenders of said recommendation listing and the mainstream/leftfield relative rankings, wherein said combining further comprises:
creating a first temporary listing by looping each of the match listings to sequentially add entries based on genre; and
creating a second temporary listing by looping said first temporary listing to sequentially add entries based on recommender.

26. An apparatus, comprising:
at least one processor; and
at least one memory including computer program code,
the at least one memory and the computer program code configured to, with the at least one processor, cause the apparatus to perform at least the following,
cause, at least in part, storing metadata values for each of one or more content offerings, each offering having metadata identifying a primary metagenre, a sub-genre of said primary metagenre, a secondary metagenre, one or more recommenders, and rankings assigned to respective metagenres by the recommenders;
receive user preference information identifying one or more metagenres preferred by said user, and one or more preferred sub-genres for each preferred metagenre;
generate a first genre match listing of said content offerings, by identifying offerings whose primary and secondary metagenre data match the user's preferences, ordering the offerings with highest ranking first, and scattering the offerings per metagenre and per recommender;
generate a second genre match listing of said content offerings, by identifying offerings whose primary metagenre data and corresponding sub-genre data match the user's preferences, ordering the offerings with highest ranking first, and scattering the offerings per metagenre and per recommender;
generate a third genre match listing of content offerings, by identifying offerings whose primary metagenre data matches the user's preferences but whose secondary metagenre data does not match the user's preferences, ordering the offerings with highest ranking first, and scattering the offerings per metagenre and per recommender; and
generate a recommendation listing by combining the match listings, the recommendation list eliminates listings having one or more common adjacent metagenres or recommenders,
wherein said combining further comprises:
creating a first temporary listing via looping each of the match listings to sequentially add entries based on genre; and
creating a second temporary listing via looping-said first temporary listing to sequentially add entries based on recommender.

27. The apparatus of claim 26, wherein the apparatus is further caused to obtain DRM (Digital Rights Management) information for said offerings.

28. The apparatus of claim 27, wherein the apparatus is further caused to offer access to one or more media files according to said DRM and said content offering information.

* * * * *